(12) United States Patent
English (10) Patent No.: US 10,968,884 B2
(45) Date of Patent: Apr. 6, 2021

(54) FLUID FLOW ENERGY HARVESTER

(71) Applicant: Douglas Richard English, Beeliar (AU)

(72) Inventor: Douglas Richard English, Beeliar (AU)

( * ) Notice: Subject to any disclaimer, the term of this patent is extended or adjusted under 35 U.S.C. 154(b) by 0 days.

(21) Appl. No.: 16/641,733

(22) PCT Filed: Aug. 21, 2018

(86) PCT No.: PCT/AU2018/050886
§ 371 (c)(1),
(2) Date: Feb. 25, 2020

(87) PCT Pub. No.: WO2019/040974
PCT Pub. Date: Mar. 7, 2019

(65) Prior Publication Data
US 2020/0256310 A1   Aug. 13, 2020

(30) Foreign Application Priority Data

Sep. 1, 2017   (AU) .................................. 2017903532

(51) Int. Cl.
*F03B 17/06*   (2006.01)
*F03B 13/26*   (2006.01)
(Continued)

(52) U.S. Cl.
CPC ............ *F03B 17/06* (2013.01); *F03B 13/264* (2013.01); *F03D 5/06* (2013.01); *F05B 2210/16* (2013.01); *F05B 2270/606* (2013.01); *F16C 3/10* (2013.01)

(58) Field of Classification Search
CPC .......... F03B 13/264; F03B 17/06; F03D 5/06; F05B 2210/16
(Continued)

(56) References Cited

U.S. PATENT DOCUMENTS 1,688,032 A * 10/1928 Blair .................... F03B 13/1815
60/500
2,465,285 A *  3/1949 Schwickerath ......... F03B 17/06
416/41
(Continued)

FOREIGN PATENT DOCUMENTS

DE   102015222448 A1   5/2017
EP       2587049 A2   5/2013
(Continued)

*Primary Examiner* — Pedro J Cuevas
(74) *Attorney, Agent, or Firm* — David Guerra (57) ABSTRACT

Provided is a fluid flow energy harvester (10) comprising a crankshaft (12) and at least one vane (14) pivoted into a sail portion (18) and a crank portion (20) on respective sides of the pivot (16). Both portions (18) and (20) are operatively oscillatable about the pivot (16) when the crank portion (20) is operatively arranged facing into a fluid flow (22). The crank portion (20) is linked to the crankshaft (12) via a crank (24) so that operative oscillation of the vane (14) imparts rotational force to said crankshaft (12). The harvester (10) also includes a fin arrangement (26) which comprises a fin (28) arranged on, and configured to guide, the sail portion (18) of the vane (14) facing towards or in a direction of the fluid flow (22). The harvester (10) also includes a fin actuator (30) configured to control an orientation of the fin (28) relative to the sail portion (18), so that during oscillation of the sail portion (18), either a surface (32) of the sail portion or a surface of the fin (34) impedes the fluid flow (22) when a surface of the other is parallel to such fluid flow. In this manner, stalling of the vane oscillation is counteracted thereby facilitating continuous rotation of the crankshaft (12) during fluid flow (22).

20 Claims, 7 Drawing Sheets

(51) Int. Cl.
*F03D 5/06* (2006.01)
*F16C 3/10* (2006.01)

(58) Field of Classification Search
USPC .................. 290/53–55; 416/1, 41, 80, 83
See application file for complete search history.

(56) References Cited

U.S. PATENT DOCUMENTS

| | | | | |
|---|---|---|---|---|
| 3,995,972 A * | 12/1976 | Nassar | ............... | F03D 5/06 416/68 |
| 4,184,805 A * | 1/1980 | Arnold | ............... | F03D 5/06 416/1 |
| 4,242,050 A * | 12/1980 | Oakes | ............... | F03D 15/00 416/170 R |
| 4,470,770 A * | 9/1984 | Grose | ............... | F03D 5/06 416/79 |
| 4,525,122 A * | 6/1985 | Krnac | ............... | F03D 5/06 416/80 |
| 4,915,584 A * | 4/1990 | Kashubara | ............ | F03D 5/06 416/64 |
| 5,009,571 A * | 4/1991 | Smith | ............... | F03D 5/06 416/79 |
| 5,084,630 A * | 1/1992 | Azimi | ............... | F03B 13/182 290/53 |
| 5,193,978 A * | 3/1993 | Gutierrez | ............ | F03D 3/067 416/119 |
| 5,324,169 A * | 6/1994 | Brown | ............... | F03B 17/06 416/17 |
| 5,548,956 A * | 8/1996 | Price | ............... | F03B 17/06 415/3.1 |
| 5,708,305 A * | 1/1998 | Wolfe | ............... | F03B 13/1815 290/42 |
| 5,899,664 A * | 5/1999 | Lawrence | ............ | F03B 17/06 416/197 A |
| 6,217,284 B1 * | 4/2001 | Lawrence | ............ | F03B 17/062 415/3.1 |
| 6,273,680 B1 * | 8/2001 | Arnold | ............... | F03B 17/00 416/1 |
| 6,323,563 B1 * | 11/2001 | Kallenberg, Jr. | ..... | F03B 17/067 290/42 |
| 6,652,232 B2 * | 11/2003 | Bolduc | ............... | F03B 17/06 416/24 |
| 6,726,440 B2 | 4/2004 | Pollard | | |
| 7,493,759 B2 * | 2/2009 | Bernitsas | ............ | F03B 17/06 60/497 |
| 7,632,069 B2 * | 12/2009 | Kelley | ............... | F03B 17/06 416/80 |
| 7,834,474 B2 * | 11/2010 | Whittaker | ............ | F03B 13/182 290/53 |
| 7,905,705 B2 * | 3/2011 | Kelley | ............... | F03B 17/06 416/80 |
| 7,989,973 B2 * | 8/2011 | Birkestrand | ......... | E02B 9/00 290/44 |
| 8,049,357 B2 * | 11/2011 | Saavedra | ............ | F03B 17/00 290/42 |
| 8,278,776 B1 * | 10/2012 | Arntz | ............... | F03D 5/00 290/54 |
| 8,884,457 B1 * | 11/2014 | Jones | ............... | F03B 17/06 290/54 |
| 8,916,987 B2 * | 12/2014 | Schultz | ............... | F03B 17/06 290/53 |
| 9,080,556 B2 * | 7/2015 | Xu | ............... | F03D 3/068 |
| 9,291,147 B2 * | 3/2016 | Jones | ............... | F03B 17/06 |
| 9,429,401 B2 * | 8/2016 | Corder | ............... | F42B 19/01 |
| 9,562,434 B2 | 2/2017 | Liu | | |
| 9,732,724 B1 * | 8/2017 | Burke | ............... | F03B 17/06 |
| 9,841,003 B2 * | 12/2017 | Curutchet | ............ | F03D 3/068 |
| 10,208,731 B2 * | 2/2019 | Kerr | ............... | F03B 17/06 |
| 10,408,187 B2 * | 9/2019 | Duffy | ............... | F03B 13/181 |
| 10,590,907 B2 * | 3/2020 | Chen | ............... | F03B 17/06 |
| 10,662,922 B2 * | 5/2020 | Sichman | ............ | F03D 5/06 |
| 10,807,680 B2 * | 10/2020 | Tsao | ............... | H02K 7/1823 |
| 10,858,086 B2 * | 12/2020 | Dipnall | ............... | B63H 1/32 |
| 2003/0123983 A1 * | 7/2003 | Bolduc | ............... | F03D 5/06 416/6 |
| 2007/0157864 A1 * | 7/2007 | Aldin | ............... | B63B 1/107 114/281 |
| 2008/0148723 A1 * | 6/2008 | Birkestrand | ......... | E02B 9/00 60/327 |
| 2008/0191485 A1 * | 8/2008 | Whittaker | ............ | F03B 13/182 290/53 |
| 2009/0121490 A1 * | 5/2009 | Platzer | ............... | F03B 17/065 290/55 |
| 2009/0191772 A1 * | 7/2009 | Wu | ............... | B63H 1/32 440/14 |
| 2009/0224549 A1 * | 9/2009 | Williams | ............ | F03D 9/13 290/55 |
| 2009/0224551 A1 * | 9/2009 | Williams | ............ | F03D 5/06 290/55 |
| 2010/0019504 A1 * | 1/2010 | Kelley | ............... | F03D 5/06 290/55 |
| 2010/0045046 A1 * | 2/2010 | Douglas | ............... | F03B 17/065 290/54 |
| 2010/0140933 A1 * | 6/2010 | Finnigan | ............ | F03B 13/264 290/43 |
| 2010/0143115 A1 * | 6/2010 | Kerr | ............... | F03D 5/00 416/1 |
| 2012/0235417 A1 * | 9/2012 | Arntz | ............... | F03D 5/00 290/55 |
| 2012/0321469 A1 * | 12/2012 | Xu | ............... | F03D 3/068 416/147 |
| 2015/0147176 A1 * | 5/2015 | Curutchet | ............ | F03D 7/04 416/41 |
| 2015/0362301 A1 * | 12/2015 | Corder | ............... | F42B 10/02 244/3.24 |
| 2017/0101978 A1 * | 4/2017 | Liu | ............... | F01D 5/00 |
| 2019/0331088 A1 * | 10/2019 | Durham | ............... | F03B 17/06 |
| 2020/0300218 A1 * | 9/2020 | Curutchet | ............ | F03B 17/065 |

FOREIGN PATENT DOCUMENTS

| | | |
|---|---|---|
| WO | 2004110859 A1 | 12/2004 |
| WO | 2017021867 A1 | 2/2017 |

\* cited by examiner

FLUID FLOW ENERGY HARVESTER

CROSS-REFERENCE TO RELATED APPLICATIONS

This application is an U.S. national phase application under 35 U.S.C. § 371 based upon co-pending International Application No. PCT/AU2018/050886 filed on Aug. 21, 2018. Additionally, this U.S. national phase application claims the benefit of priority of co-pending International Application No. PCT/AU2018/050886 filed on Aug. 21, 2018 and Australia Application No. 2017903532 filed on Sep. 1, 2017. The entire disclosures of the prior applications are incorporated herein by reference. The international application was published on Mar. 7, 2019 under Publication No. WO 2019/040974 A1.

TECHNICAL FIELD

This invention relates to the field of renewable energy, in general, and more particularly to a fluid flow energy harvester and an associated method of harvesting energy from a fluid flow.

BACKGROUND ART

The following discussion of the background art is intended to facilitate an understanding of the present invention only. The discussion is not an acknowledgement or admission that any of the material referred to is or was part of the common general knowledge as at the priority date of the application.

The concept of harvesting energy from fluid flow, i.e. wind, water, etc., has been around for hundreds of years, with archaeological evidence showing use of watermills in Egypt, India, Greece, and other parts of Eurasia from the fourth to third centuries B.C.E. Similarly, the wind-powered organ of the Greek engineer Heron of Alexandria in the first century is the earliest known instance of using a wind-driven wheel to power a machine; however, wind power has been used as long as humans have put sails into the wind.

The incentive to use more and more renewable energy, for electricity, transport, or even total primary energy supply globally, has been motivated by global warming and other ecological as well as economic concerns, such as sustainability and pollution. The most significant barriers to the widespread implementation of large-scale renewable energy and low carbon energy strategies are primarily political rather than technological, and rapid reliance on renewable energy sources is occurring on a global scale.

In one example, marine energy, or movement of water in the world's oceans, rivers or canals, creates a vast store of kinetic energy. This energy can be harnessed to generate electricity to power homes, transport and industries. The term marine energy encompasses both wave power—power from surface waves, and tidal power—obtained from the kinetic energy of large bodies of moving water. Similarly, wind power, as an alternative to burning fossil fuels, is plentiful, renewable, widely distributed, clean, produces no greenhouse gas emissions during operation, consumes no significant water during operation, and uses relatively little land.

Accordingly, a variety of devices have been developed to harvest energy from fluid flow, including both water and air. In light hereof, Applicant has identified a need for a rugged device which is able to efficiently provide energy from fluid flow in harsh environments, as well as being easily scalable and adaptable to various types of fluid flow.

As such, the present invention seeks to propose possible improvements, at least in part, to the field of renewable energy harvesting from fluid flow.

SUMMARY OF THE INVENTION

According to a first aspect of the invention there is provided a fluid flow energy harvester operatively arrangeable in a fluid flow, said harvester comprising:
 a crankshaft;
 at least one vane pivoted into complementary sail and crank portions on respective sides of such pivot, said sail and crank portions operatively oscillatable about the pivot, the crank portion linked to the crankshaft via a crank so that operative oscillation of the vane imparts rotational force to the crankshaft; and
 a fin arrangement comprising a fin steerably arranged on the vane with a fin actuator configured to steer an orientation of said fin relative to the vane so that, during oscillation of the sail portion, either a surface of the sail portion or of the fin impedes the fluid flow when a surface of the other is substantially parallel to such fluid flow, thereby counteracting stalling of vane oscillation to facilitate continuous rotation of the crankshaft during fluid flow.

Typically, the crank portion is operatively arranged facing into oncoming fluid flow with the sail portion facing towards outgoing or trailing fluid flow.

In another example, the sail portion is operatively arranged facing into oncoming fluid flow with the crank portion facing towards outgoing or trailing fluid flow.

Typically, the fin arrangement is arranged on either the sail portion or the crank portion.

Typically, the harvester comprises two, three, four or more vanes each with associated fin arrangements, each vane coaxially pivoted with their respective crank portions linked to complementary positions on the crankshaft, so that oscillation of the respective vanes imparts a balanced rotational force on the crankshaft. It is to be appreciated that different embodiments may have any suitable different number of vanes, depending on requirements.

Alternatively, the harvester comprises two, three, four or more vanes each with associated fin arrangements, the vanes having parallel axial pivots with their respective crank portions linked to complementary positions on the crankshaft, so that oscillation of the respective vanes imparts a balanced rotational force on the crankshaft.

Typically, the vane is configured so that the crank portion provides minimal resistance to the incoming (or outgoing) fluid flow and the surface of the sail portion provides maximal resistance to the trailing, outgoing or incoming fluid flow, as appropriate.

Typically, an axis of the pivot and an axis of the crankshaft are arranged in parallel to ensure efficient energy transfer.

Typically, the crank is linked to both the crankshaft and crank portion via suitable crank pins.

In one example, the fin is steerably pivoted on the vane, the fin actuator comprising a linkage between the pivoted fin and a caroming groove in the crankshaft, said caroming groove configured to suitably steer or guide an orientation of the fin as the vane completes one full oscillation.

In one example, the fin is steerably pivoted on the sail portion, the fin actuator comprising a linkage between the pivoted fin and a caroming groove in the crankshaft, said caroming groove configured to suitably steer or guide the fin as the vane completes one full oscillation.

In another example, the fin actuator comprises an electronic fluid flow sensor and electromechanical actuator configured to suitably guide the fin as the vane completes one full oscillation.

In a further example, the fin actuator comprises a hydraulic actuator configured to suitably guide the fin as the vane completes one full oscillation.

In one example, the harvester includes a flywheel or similar energy storage arrangement configured to store angular momentum to counteract stalling of vane oscillation thereby facilitating continuous rotation of the crankshaft during fluid flow. The flywheel is typically coupled to the crankshaft.

Typically, the harvester includes a yaw system configured for automatically orientating the crank portion or sail portion into the oncoming fluid flow with the sail portion or crank portion, respectively, into the direction of outgoing or trailing fluid flow.

Typically, the vane and/or fin defines a predetermined profile operatively presented to the fluid flow.

In one example, the predetermined profile is configured to generate lift from the fluid flow, i.e. aerodynamic or hydrodynamic force.

According to a second aspect of the invention there is provided a fluid flow energy harvester comprising:

a crankshaft; and two or more vanes each pivoted into a sail portion and a crank portion on respective sides of respective pivots, with both portions operatively oscillatable about their pivot when each crank portion is operatively arranged in a fluid flow, each crank portion linked to the crankshaft via a crank so that operative oscillation of the vane imparts rotational force to said crankshaft, wherein each vane is suitably linked to said crankshaft such that during oscillation of the respective sail portions, at least one surface of a sail portion impedes the fluid flow when a surface of the other is parallel to such fluid flow to counteract stalling of vane oscillation thereby facilitating continuous rotation of the crankshaft during fluid flow.

Typically, the harvester comprises two, three, four or more vanes with each vane coaxially pivoted with their respective crank portions linked to suitable positions on the crankshaft, so that respective oscillations of the vanes impart a balanced rotational force on the crankshaft.

Alternatively, the harvester comprises two, three, or four vanes each having parallel axial pivots with their respective crank portions linked to suitable positions on the crankshaft, so that respective oscillation of the vanes imparts a balanced rotational force on the crankshaft.

Typically, each vane is configured so that the crank portion provides minimal resistance to the incoming or outgoing fluid flow and the surface of the sail portion provides maximal resistance to the incoming, outgoing or trailing fluid flow.

Typically, an axis of the pivot and an axis of the crankshaft are arranged in parallel to ensure efficient energy transfer.

In one example, the harvester includes a flywheel or similar energy storage arrangement configured to counteract stalling of vane oscillation thereby facilitating continuous rotation of the crankshaft during fluid flow. The flywheel is typically coupled to the crankshaft.

Typically, the harvester includes a yaw system configured for automatically orientating the crank portion into the oncoming or outgoing fluid flow with the sail portion into or away from the direction of fluid flow.

According to a third aspect of the invention there is provided a fluid flow energy harvester comprising:

a crankshaft;

at least one vane pivoted into a sail portion and a crank portion on respective sides of the pivot with both portions operatively oscillatable about the pivot when the crank portion is operatively arranged in a fluid flow, the crank portion linked to the crankshaft via a crank so that operative oscillation of the vane imparts rotational force to said crankshaft; and a fin arrangement comprising a fin arranged on, and configured to guide, the sail portion into a path of the fluid flow, and a fin actuator configured to control an orientation of said fin relative to the sail portion, so that during oscillation of the sail portion, a surface of the fin impedes the fluid flow at all times to counteract stalling of vane oscillation thereby facilitating continuous rotation of the crankshaft during fluid flow.

Typically, the harvester comprises two, three, four or more vanes each with associated fin arrangements, each vane coaxially pivoted with their respective crank portions linked to suitable positions on the crankshaft, so that respective oscillation of the vanes imparts a balanced rotational force on the crankshaft. It is to be appreciated that different embodiments may have any suitable different number of vanes, depending on requirements.

Alternatively, the harvester comprises two, three, four or more vanes each with associated fin arrangements, the vanes having parallel axial pivots with their respective crank portions linked to suitable positions on the crankshaft, so that respective oscillation of the vanes imparts a balanced rotational force on the crankshaft.

Typically, the vane is configured to provide minimal resistance to the incoming or outgoing fluid flow and the fin provides maximal resistance to the incoming or trailing fluid flow.

Typically, an axis of the pivot and an axis of the crankshaft are arranged in parallel to ensure efficient energy transfer.

Typically, the crank is linked to both the crankshaft and crank portion via suitable crank pins.

In one example, the fin is pivoted on the sail portion, the fin actuator comprising a linkage between the pivoted fin and a caroming groove in the crankshaft, said caroming groove configured to suitably guide the fin as the vane completes one full oscillation.

In another example, the fin actuator comprises an electronic fluid flow sensor and actuator configured to suitably guide the fin as the vane completes one full oscillation.

In a further example, the fin actuator comprises a hydraulic actuator configured to suitably guide the fin as the vane completes one full oscillation.

In one example, the harvester includes a flywheel or similar energy storage arrangement configured to counteract stalling of vane oscillation thereby facilitating continuous rotation of the crankshaft during fluid flow. The flywheel is typically coupled to the crankshaft.

Typically, the harvester includes a yaw system configured for automatically orientating the crank portion into the oncoming or outgoing fluid flow with the fin into the direction of fluid flow.

According to a fourth aspect of the invention there is provided a method of harvesting energy from a fluid flow, said method comprising the steps of:

arranging a fluid flow energy harvester into a fluid, said harvester comprising a crankshaft; at least one vane pivoted into a sail portion and a crank portion on respective sides of the pivot with both portions operatively oscillatable about the pivot when the crank portion is operatively arranged in a fluid flow, the crank portion linked to the crankshaft via a crank so that operative oscillation of the vane imparts rotational force to said crankshaft; and a fin arrangement comprising a fin arranged on, and configured to guide, the sail portion into a path of the fluid flow, and a fin actuator configured to control an orientation of said fin relative to the sail portion, so that during oscillation of the sail portion, either a surface of the sail portion or of the fin impedes the fluid flow when a surface of the other is parallel to such fluid flow to counteract stalling of vane oscillation thereby facilitating continuous rotation of the crankshaft during fluid flow; and harvesting energy from the rotating crankshaft.

According to a fifth aspect of the invention there is provided a method of harvesting energy from a fluid flow, said method comprising the steps of:

arranging a fluid flow energy harvester into a fluid, said harvester comprising a crankshaft and two or more vanes each pivoted into a sail portion and a crank portion on respective sides of respective pivots, with both portions operatively oscillatable about their pivot when each crank portion is operatively arranged into a fluid flow, each crank portion linked to the crankshaft via a crank so that operative oscillation of the vane imparts rotational force to said crankshaft, wherein each vane is suitably linked to said crankshaft such that during oscillation of the respective sail portions, at least one surface of a sail portion impedes the fluid flow when a surface of the other is parallel to such fluid flow to counteract stalling of vane oscillation thereby facilitating continuous rotation of the crankshaft during fluid flow; and harvesting energy from the rotating crankshaft.

According to a sixth aspect of the invention there is provided a method of harvesting energy from a fluid flow, said method comprising the steps of:

arranging a fluid flow energy harvester into a fluid, said harvester comprising a crankshaft and at least one vane pivoted into a sail portion and a crank portion on respective sides of the pivot with both portions operatively oscillatable about the pivot when the crank portion is operatively arranged in a fluid flow, the crank portion linked to the crankshaft via a crank so that operative oscillation of the vane imparts rotational force to said crankshaft, as well as a fin arrangement comprising a fin arranged on, and configured to guide, the sail portion facing into a path of the fluid flow, and a fin actuator configured to control an orientation of said fin relative to the sail portion, so that during oscillation of the sail portion, a surface of the fin impedes the fluid flow at all times to counteract stalling of vane oscillation thereby facilitating continuous rotation of the crankshaft during fluid flow; and harvesting energy from the rotating crankshaft.

BRIEF DESCRIPTION OF THE DRAWINGS

The description will be made with reference to the accompanying drawings in which.

DETAILED DESCRIPTION OF EMBODIMENTS

Further features of the present invention are more fully described in the following description of several non-limiting embodiments thereof. This description is included solely for the purposes of exemplifying the present invention to the skilled addressee. It should not be understood as a restriction on the broad summary, disclosure or description of the invention as set out above. In the figures, incorporated to illustrate features of the example embodiment or embodiments, like reference numerals are used to identify like parts throughout.

With reference to FIGS. 1 to 4 of the accompanying drawings, there is shown a simplified example of a fluid flow energy harvester 10. In the exemplified embodiments, fluid flow (albeit air, a gas, a fluid etc.) is indicated via dashed arrows 22. In addition, in FIGS. 1 to 4, forces acting on components are indicated via solid arrows, with a relative magnitude of such forces represented by a relative size of said arrows. The skilled addressee will appreciate that such indicated forces are not to scale and are used for exemplifying one possible embodiment of the invention only.

Referring now to FIGS. 1 to 4, one example of a fluid flow energy harvester 10 is shown. The harvester 10 generally comprises a crankshaft 12 and at least one vane 14 pivoted into a sail portion 18 and a crank portion 20 on respective sides of the pivot 16. Both portions 18 and 20 are operatively oscillatable about the pivot 16 when the crank portion 20 is operatively arranged facing into a fluid flow 22, as shown.

The skilled addressee will appreciate that such oscillation about the pivot 16 is similar to a seesaw or teeter-totter motion and occurs in a complementary manner, i.e. when one portion moves upwards the other moves downwards, or the like. Mechanically, the vane 14 and pivot 16 forms a lever comprising the vane 14 as a beam with said pivot 16 dividing the vane 14 into the sail portion 18 and the crank portion 20, as shown.

The skilled addressee is further to appreciate that the harvester 10 may be arranged in any suitable direction along the path of the fluid flow 22. For example, the crank portion 20 may face into the incoming fluid flow with the sail portion 18 facing towards trailing or outgoing fluid flow, or the sail portion 18 may face into the incoming fluid flow with the crank portion 20 facing towards trailing or outgoing fluid flow. In the exemplified embodiments, the crank portion 20 is generally described as facing into oncoming fluid flow, but the invention is not limited to such an embodiment.

The crank portion 20 is typically linked to the crankshaft 12 via a crank 24 so that operative oscillation of the vane 14 imparts rotational force to said crankshaft 12, i.e. as the vane 14 oscillates up and down, the crankshaft 12 rotates, as indicated.

The harvester 10 also includes a fin arrangement 26 which typically comprises a fin 28 steerably arranged on, and configured to guide, the sail portion 18 of the vane 14 facing towards or in a direction of the fluid flow 22. The fin arrangement 26 may be arranged on either the sail portion 18 or the crank portion 20, as per requirements. The harvester 10 also generally includes a fin actuator 30 configured to guide and control an orientation of the fin 28 relative to the sail portion 18, so that during oscillation of the sail portion 18, either a surface 32 of the sail portion or a surface of the fin 34 impedes the fluid flow 22 when a surface of the other is parallel to such fluid flow. In this manner, stalling of the vane oscillation is counteracted thereby facilitating continuous rotation of the crankshaft 12 during fluid flow 22.

It is to be appreciated that the configuration of the harvester 10 generally facilitates a surface area of either the sail portion 32 or the fin 34 to be exposed to the fluid flow 22 in such a manner as to prevent stalling of the vane oscillation and, hence, rotation of the crankshaft 12.

For example, and as generally indicated by force arrows in FIGS. 1 to 4, depending on a position of the sail portion 18 of the vane 14 relative to the fluid flow 22, the fin 28 is orientated, via fin actuator 30, to present either a large area thereof 34 to the fluid flow when the surface of the sail portion 32 is substantially parallel to such fluid flow 22, or to be substantially parallel to the fluid flow 22 itself when the surface of the sail portion 32 presents itself to the fluid flow 22. In this manner, a resultant force on either the sail portion 18 or on the fin 28 from the fluid flow 22 facilitates continues oscillation of the vane 14, and hence rotation of the crankshaft 12.

Figure 1:
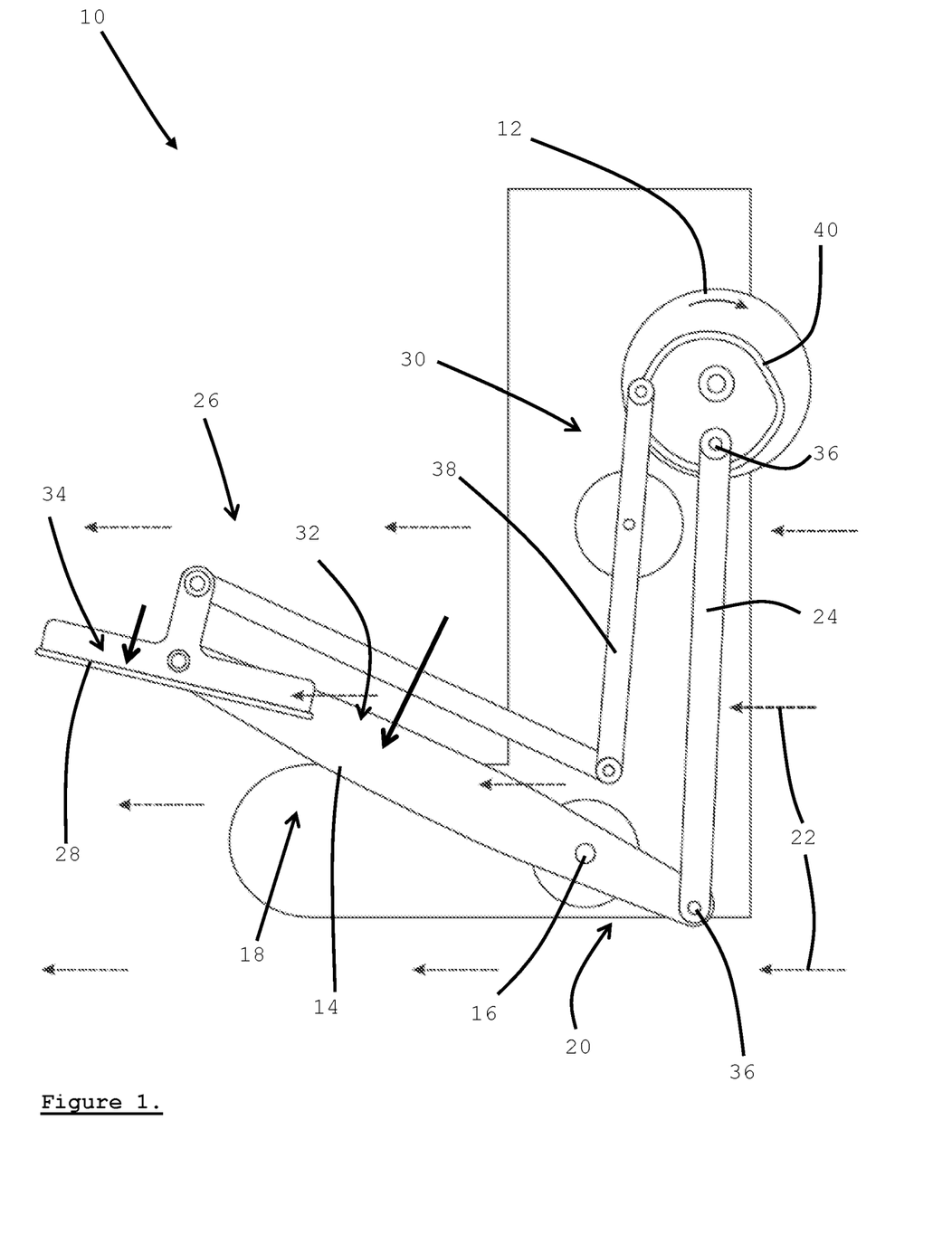
FIGS. 1 to 4 are diagrammatic side-view representations of one example of a fluid flow energy harvester, in accordance with an aspect of the invention, showing interaction between components thereof when subjected to fluid flow.
Figure 2:
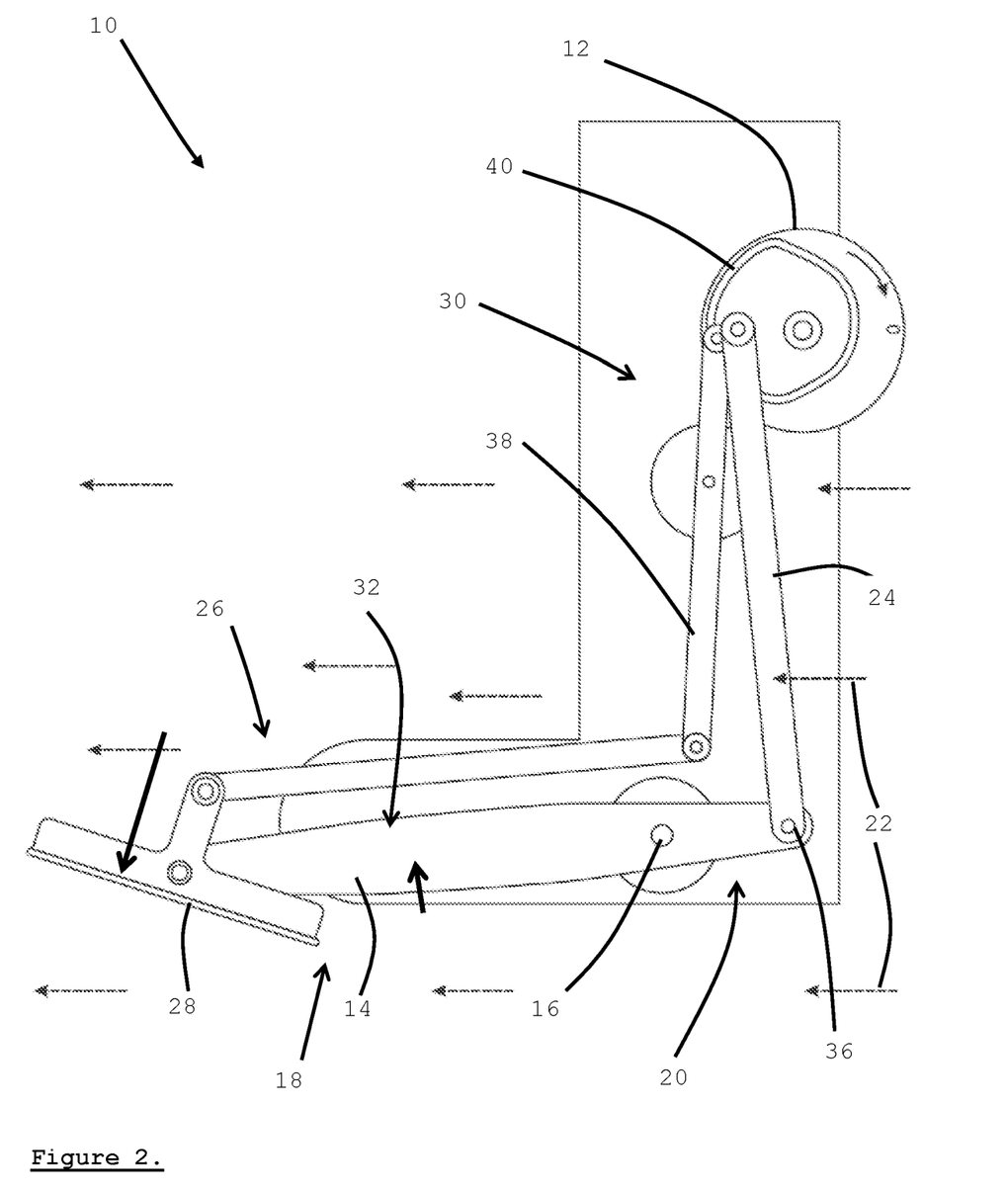
Figure 3:
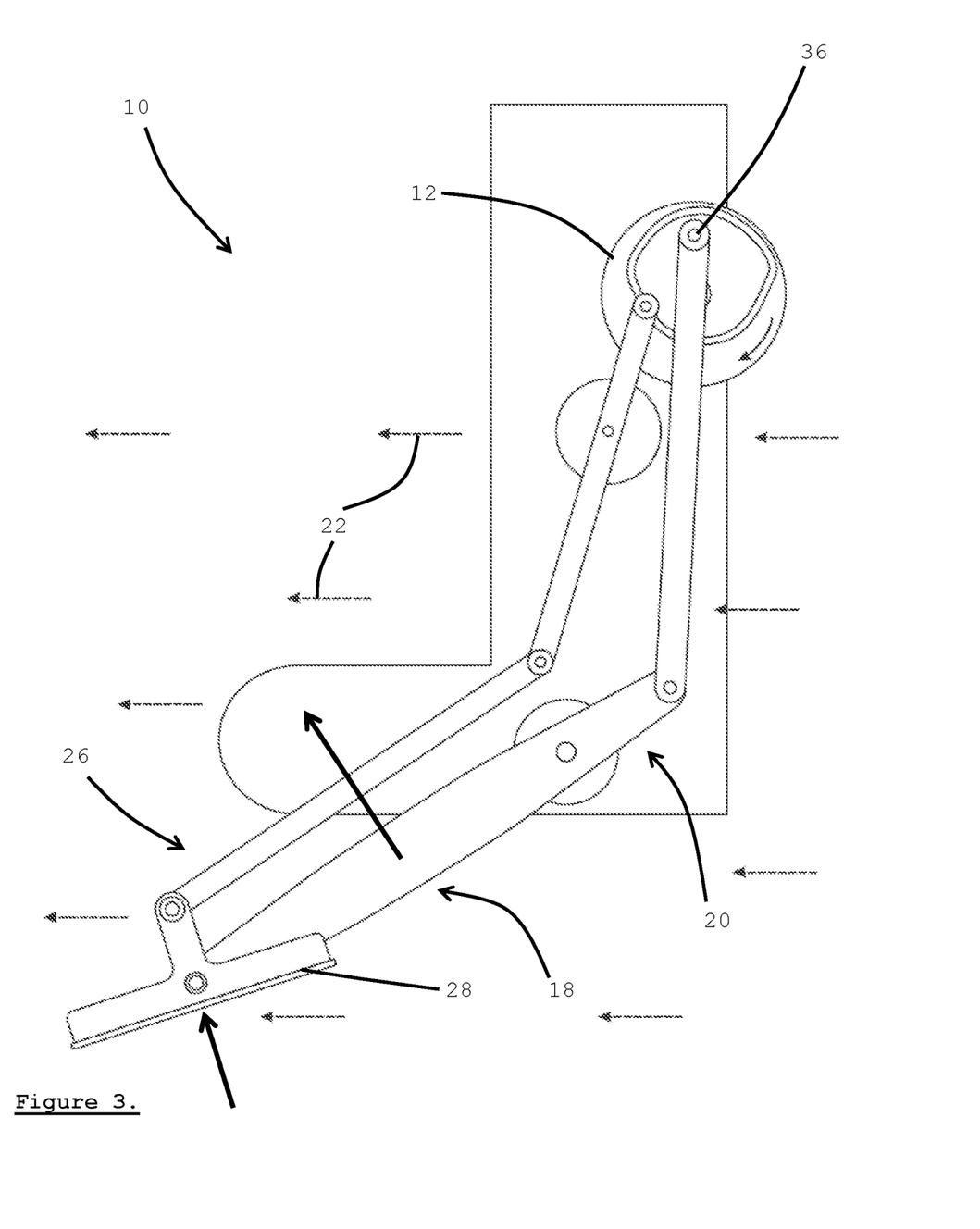
Figure 4:
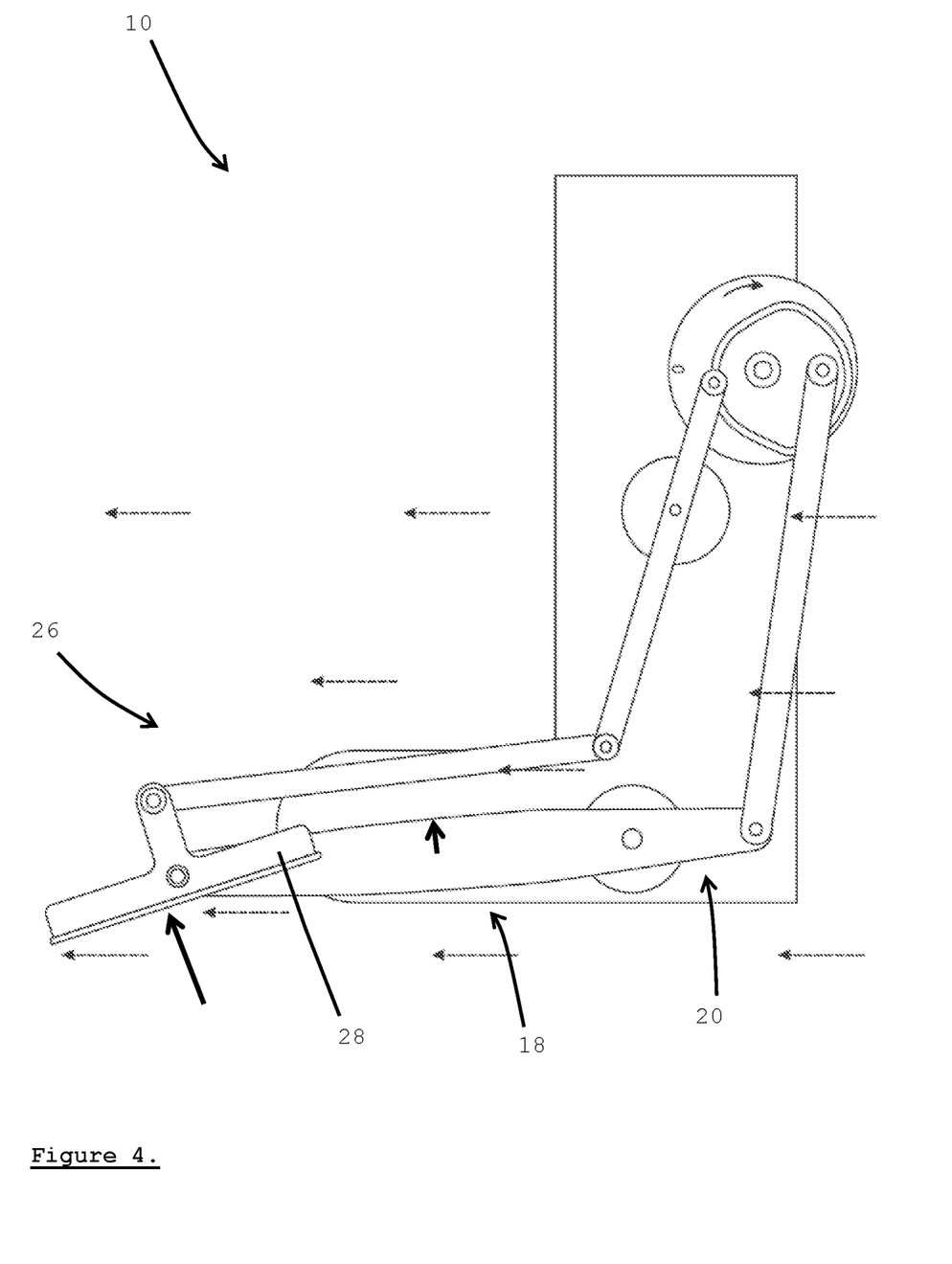
Figure 5:
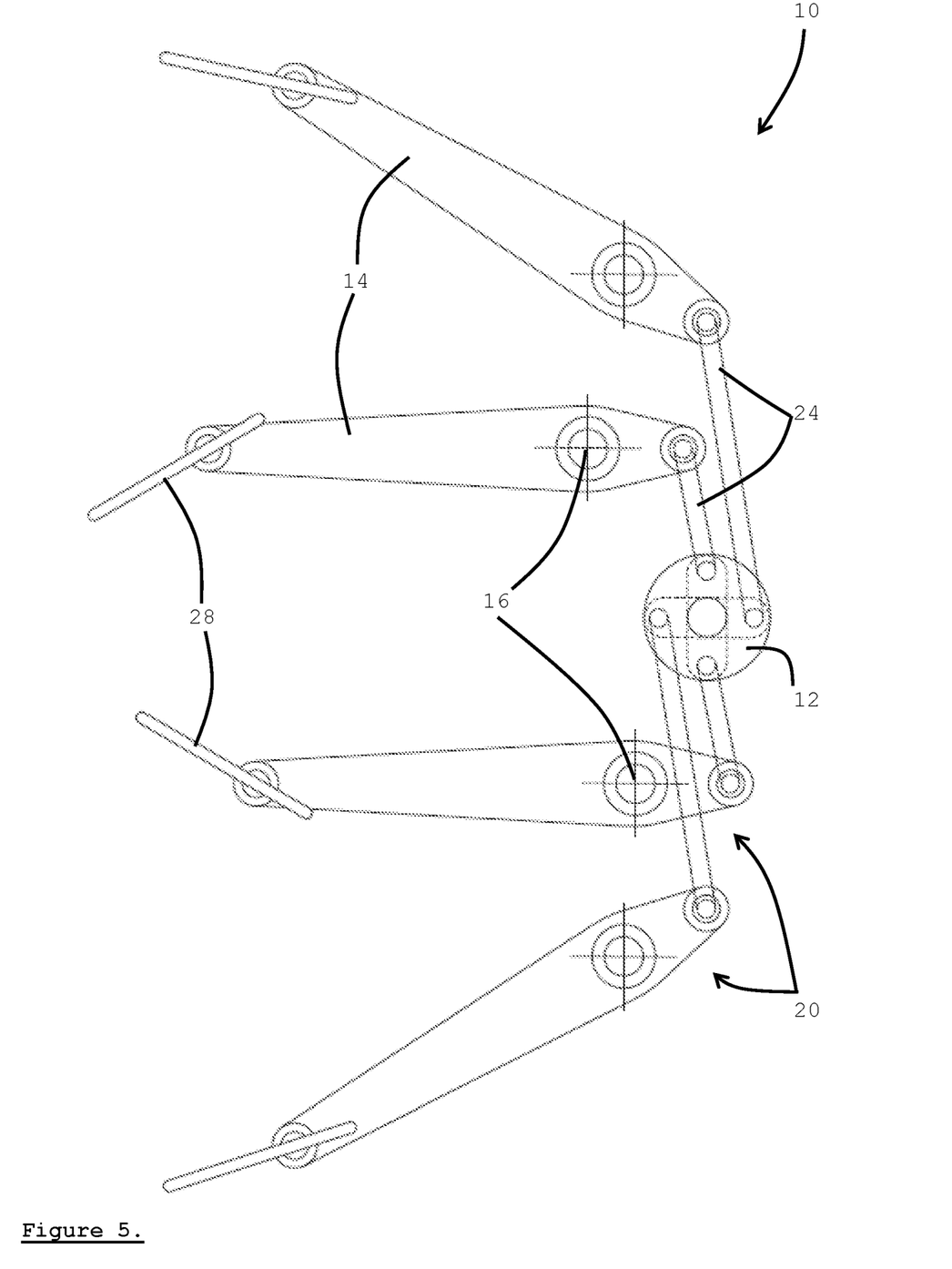
FIG. 5 is a diagrammatic side-view representation of a further example of a fluid flow energy harvester.
Figure 6:
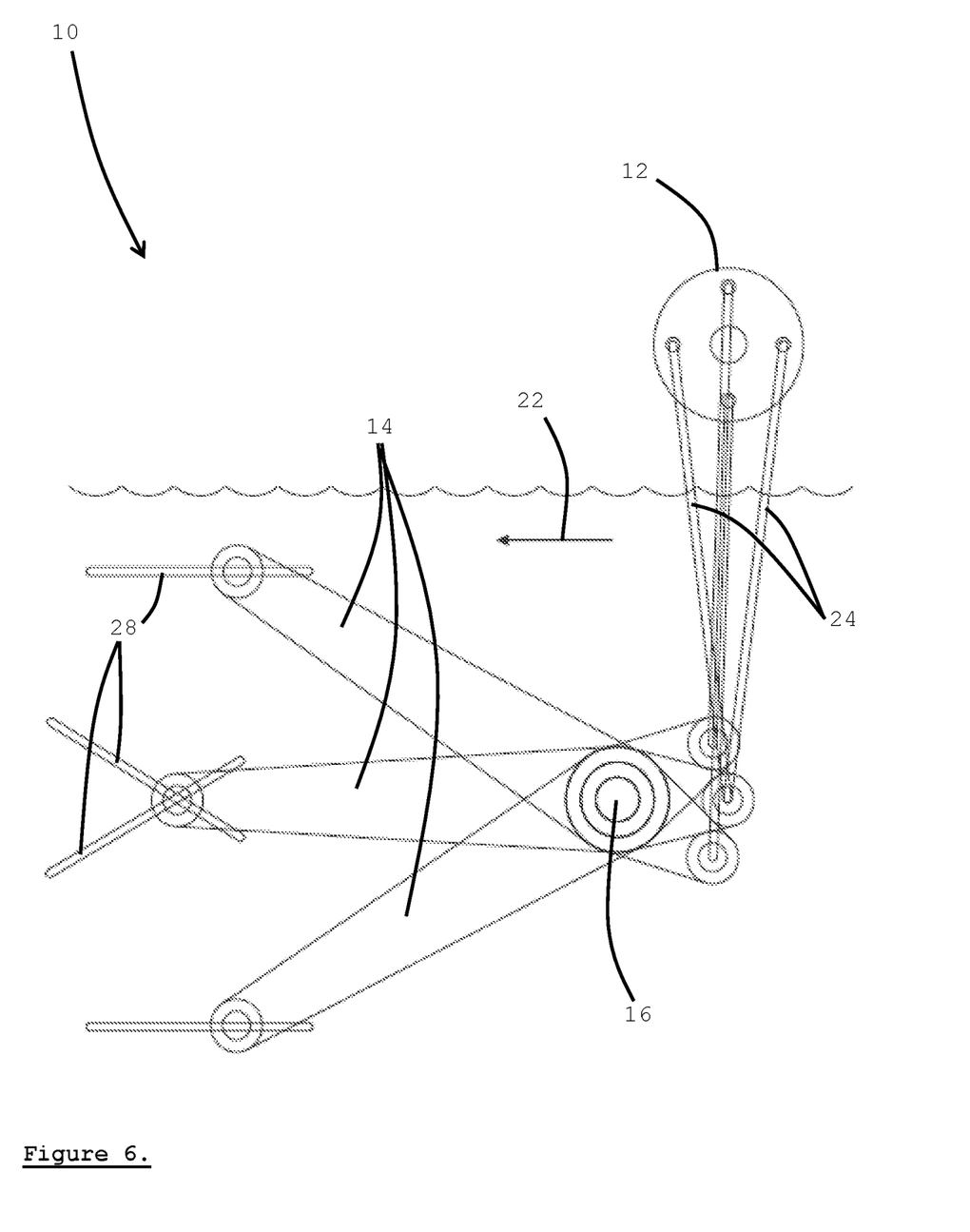
FIG. 6 is a diagrammatic side-view representation of a yet further example of a fluid flow energy harvester.

As more clearly shown in FIGS. 5 and 6, different embodiments of the harvester 10 may comprise two, three, or four (or more) vanes 14, each with associated fin 26 arrangements, each vane 14 coaxially pivoted with their respective crank portions 20 linked to suitable positions on the crankshaft 12, so that respective oscillation of the vanes 14 imparts a balanced rotational force on the crankshaft 12. It is to be appreciated that different embodiments may have any suitable different number of vanes 14, depending on requirements, and that the present invention is not limited by the number of vanes 14 on the harvester 10.

In an alternative embodiment, shown in FIG. 5, the harvester 10 may comprise two, three, or four vanes 14, each with associated fin arrangements 26 and fins 28, wherein the vanes 14 have parallel axial pivots 16 with their respective crank portions 20 linked to suitable positions on the crankshaft 12, so that respective oscillation of the vanes 14 imparts a balanced rotational force on the crankshaft 12. Typically, an axis of the pivot 16 and an axis of the crankshaft 12 are arranged in parallel to ensure efficient energy transfer, but this is not strictly required.

Accordingly, the respective positions of the vanes 14 and their associated pivots 16 can vary in relation to the crankshaft 12, and any such variations are within the scope of the present invention.

In a typical example, each vane 14 is configured so that the crank portion 20 provides minimal resistance to the incoming (or outgoing) fluid flow 22, whilst the surface 32 of the sail portion 18 provides maximal resistance to the trailing (or incoming, depending on design) fluid flow 22.

In one example, the vane 14 and/or fin 28 defines a predetermined profile operatively presented to the fluid flow, e.g. a wing shape, a channelled profile, and/or the like. This predetermined profile is typically configured to generate lift from the fluid flow, i.e. aerodynamic or hydrodynamic force, or to channel air flow as required to facilitate operation of the harvester 10, such as minimising turbulence, and/or the like. For example, each fin and/or vane of a multi-vane harvester may be profiled to provide lift from the fluid flow when said fin or vane is at a position which provides minimal impediment to such fluid flow. The skilled addressee will appreciate that this predetermined profile can be used to prevent stalling of vane oscillation to facilitate continuous rotation of the crankshaft during fluid flow.

As is shown in the exemplified embodiments, each crank 24 is typically linked to both the crankshaft 12 and the respective crank portions 20 via suitable crank pins 36.

In the current example, the fin 28 is pivoted on the sail portion 20, as shown, with the fin actuator 30 comprising a linkage 38 between the pivoted fin 28 and a caroming groove 40 in the crankshaft 12. This camming groove 40 is configured to suitably guide the fin 28 as the vane 14 completes one full oscillation, i.e. the linkage 38 is actuated via engaging with said camming groove 40 in order to actuate the fin 28, as shown in FIGS. 1 to 4. As will be appreciated by the skilled addressee, the linkage 38 may comprise any of several types of arms or levers for imparting rotary motion to the crankshaft via the oscillatory motion of the vane 14, including required connecting rod(s), beams, pivot (s), etc. The design of the camming groove 40 is critical, as any imperfection in the guiding action provided by the linkage 38 is likely to interfere with the operation of the fin arrangement. Accordingly, different configurations of the camming groove have a direct impact on the operation of the harvester 10, and can be tailored according to requirements.

Importantly, in embodiments where the harvester 10 comprises a plurality of vanes 14, each vane 14 and associated fin arrangement 26 generally comprises its own camming groove 40 on the crankshaft 12, as each fin 28 requires steering for its respective vane's position relative to the other vanes 14 included in such a multi-vane harvester 10. Such multi-vane configurations are analogous to a 4-stroke internal combustion engine, where each cylinder's valves require precise opening and closing dependant on such cylinder's piston position on a crankshaft.

The skilled addressee will also appreciate that, in other examples, the fin actuator 30 may comprise an electronic fluid flow sensor and actuator (not shown) configured to suitably guide the fin 28 as the vane 12 completes one full oscillation, or the like. In a further example, the fin actuator 30 may comprise a hydraulic actuator (not shown) configured to suitably guide the fin 28 as the vane 14 completes one full oscillation.

In one example, the harvester 10 may include a flywheel or similar energy storage arrangement (not shown) configured to store angular momentum in order to counteract stalling of vane oscillation thereby facilitating continuous rotation of the crankshaft 12 during fluid flow. In such an example, the flywheel is typically coupled to the crankshaft 12, but other embodiments are possible and within the scope of the present invention.

Typically, the harvester 10 includes a yaw system (not shown) configured for automatically orientating the crank portion 20 into the oncoming fluid flow 22 with the sail portion 18 into the direction of fluid flow 22. Such a yaw system may take various forms, as will be readily understood by the skilled addressee.

Importantly, it is to be appreciated that variations on the above-described embodiments are possible and within the scope of the present invention. For example, embodiments of the harvester 10 may not require the fin arrangements 26 on each vane, or there may be significant variations between surface areas of the fins and the sail portions, and/or the like.

Figure 7:
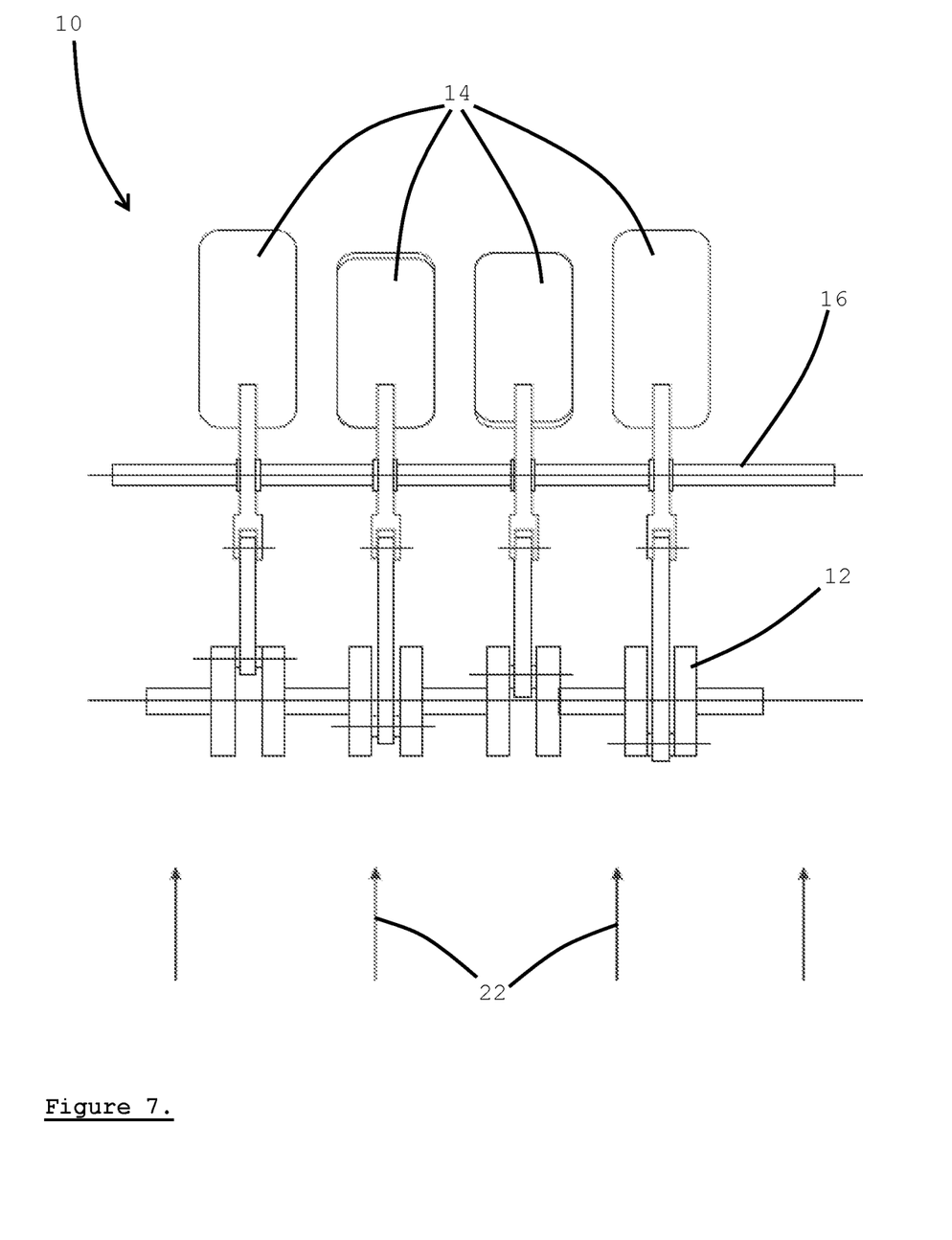
FIG. 7 is a diagrammatic top-view representation of the fluid flow energy harvester of FIG. 6.

For example, with reference to FIG. 7. One embodiment of the fluid flow energy harvester 10 may comprise a crankshaft 12 and two or more vanes 14 each pivoted into a sail portion 18 and a crank portion 20 on respective sides of their respective pivots 16. As above, both sail and crank portions 18 and 20 on each vane 14 are operatively oscillatable about their pivot 16 when each crank portion 20 is operatively arranged facing into the fluid flow 22. Each crank portion 20 is also linked to the crankshaft 12 via a suitable crank 24 so that operative oscillation of the vanes imparts rotational force to the crankshaft 12.

In such an embodiment, there are no fin arrangements 26. Instead, each vane 14 is suitably linked to the crankshaft such that during oscillation of the respective sail portions 18, at least one surface of a sail portion 18 of all the vanes 14 impedes the fluid flow 22 when a surface(s) of the other vanes is parallel to such fluid flow 22. In this manner, without the fin arrangements 26, the arrangement of the multiple vanes 14 is able to counteract stalling of vane oscillation thereby facilitating continuous rotation of the crankshaft 12 during fluid flow.

In such an example, the plurality of vanes 14 assumes the guiding function of the fin arrangement 26, as described above. In other examples having the fin arrangements 26 on the vanes 16, the fins 28 may form the primary energy harvesting surfaces, rather than the sail portions 18, or the like. Accordingly, such variations are possible and within the scope of the present invention.

In a yet further example, the fluid flow energy harvester 10 may comprise the crankshaft 12 with at least one vane 14 pivoted into a sail portion 18 and a crank portion 20 on respective sides of the pivot 16 with both portions 18 and operatively oscillatable about the pivot 16, as above. Similarly, the crank portion 20 is linked to the crankshaft 12 via a suitable crank so that operative oscillation of the vane 14 imparts rotational force to the crankshaft 12.

Such an example sees the harvester 10 having a fin arrangement 26 comprising the fin 28 arranged on, and configured to guide, the sail portion 18 facing towards a direction of the fluid flow 22, and fin actuator 30 configured to control an orientation of the fin 28 relative to the sail portion 18, so that during oscillation of the sail portion 18, a surface of the fin 34 impedes the fluid flow 22 at all times to counteract stalling of vane oscillation thereby facilitating continuous rotation of the crankshaft 12.

It is to be appreciated that, in such an example, the vane 14 with its respective sail and crank portions 18 and 20, do not necessarily provide any surface 32 for impeding the fluid flow 22, i.e. only the fin 28 is used to harvest energy from fluid flow 22, while the vane 14 may include a brace, support, spar, etc. for supporting the fin 28.

The skilled addressee will further appreciate that the present invention includes a method of harvesting energy from a fluid flow. Such a method generally comprises the steps of arranging the fluid flow energy harvester 10, as described above, into a fluid, and harvesting energy from the rotating crankshaft 12.

It is further to be appreciated that variations of the described invention are possible and within the scope of the invention. For example, the fin arrangements 26 may comprise floats or similar configurations for harvesting energy from waves. In such an example, the floats may be spaced apart for guiding the sail portions 18 in a suitable manner to facilitate continuous rotation of the crankshaft from wave energy, or the like.

In another example, the harvester 10 may be configured with the vanes stacked or arranged in a vertical manner on top of each other for wind energy applications, or the like. As described herein, the various vanes in a multi-vane configuration may also be positioned or arranged remote from each other, as long as they are sufficiently linked to the crankshaft.

The Applicant believes it particularly advantageous that the present invention provides for a robust, reliable and elegant fluid flow energy harvester able to harvest energy from fluid flow. The harvester 10 can be used in various configurations and may include any number of vanes 14, depending on requirements. The vanes 14 may also be coaxially mounted, or they may be dispersed to suit fluid flow availability. The harvester 10 may rely on a mechanical fin actuator 30, as described, which does not require complexity and is easily maintainable in harsh environments.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth. In the example embodiments, well-known processes, well-known device structures, and well-known technologies are not described in detail, as such will be readily understood by the skilled addressee.

The use of the terms "a", "an", "said", "the", and/or similar referents in the context of describing various embodiments (especially in the context of the claimed subject matter) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. As used herein, the term "and/or" includes any and all combinations of one or more of the associated listed items. No language in the specification should be construed as indicating any non-claimed subject matter as essential to the practice of the claimed subject matter.

It is to be appreciated that reference to "one example" or "an example" of the invention, or similar exemplary language (e.g., "such as") herein, is not made in an exclusive sense. Various substantially and specifically practical and useful exemplary embodiments of the claimed subject matter are described herein, textually and/or graphically, for carrying out the claimed subject matter.

Accordingly, one example may exemplify certain aspects of the invention, whilst other aspects are exemplified in a different example. These examples are intended to assist the skilled person in performing the invention and are not intended to limit the overall scope of the invention in any way unless the context clearly indicates otherwise. Variations (e.g. modifications and/or enhancements) of one or more embodiments described herein might become apparent to those of ordinary skill in the art upon reading this application. The inventor(s) expects skilled artisans to employ such variations as appropriate, and the inventor(s) intends for the claimed subject matter to be practiced other than as specifically described herein.

Any method steps, processes, and operations described herein are not to be construed as necessarily requiring their performance in the particular order discussed or illustrated, unless specifically identified as an order of performance. It is also to be understood that additional or alternative steps may be employed.

The invention claimed is:

1. A fluid flow energy harvester operatively arrangeable in a fluid flow, the harvester comprising:
   a crankshaft;
   at least one vane pivoted into complementary sail and crank portions on respective sides of such pivot, the sail and crank portions operatively oscillatable about the pivot, the crank portion being linked to the crankshaft via a crank so that operative oscillation of the vane imparts rotational force to the crankshaft; and a fin arrangement comprising a fin steerably arranged on the vane with a fin actuator configured to operatively steer an orientation of the fin relative to the vane;

wherein the fin actuator including a linkage between the fin and a camming groove defined in the crankshaft or defined in a camshaft driven by the crankshaft, the camming groove being configured to steer or guide an orientation of the fin by way of the linkage as the vane completes one full oscillation so that, during oscillation of the sail portion, either a surface of the sail portion or of the fin impedes the fluid flow when a surface of the other is substantially parallel to such fluid flow, thereby counteracting stalling of vane oscillation to facilitate continuous rotation of the crankshaft during fluid flow.

2. The fluid flow energy harvester of claim 1, wherein the crank portion is operatively arranged facing into oncoming fluid flow with the sail portion facing towards outgoing or trailing fluid flow, or the sail portion is operatively arranged facing into oncoming fluid flow with the crank portion facing towards outgoing or trailing fluid flow.

3. The fluid flow energy harvester of claim 1, wherein the fin arrangement is arranged on either the sail portion or the crank portion.

4. The fluid flow energy harvester of claim 1, wherein the vane comprises two or more vanes each with associated fin arrangements, each of the vanes being coaxially pivoted with the crank portions linked to complementary positions on the crankshaft, respectively, so that oscillation of the respective vanes imparts a balanced rotational force on the crankshaft.

5. The fluid flow energy harvester of claim 1, wherein the vane comprises two or more vanes each with associated fin arrangements, the vanes having parallel axial pivots with the crank portions linked to complementary positions on the crankshaft, respectively, so that oscillation of the respective vanes imparts a balanced rotational force on the crankshaft.

6. The fluid flow energy harvester of claim 1, wherein the vane is configured so that the crank portion provides a minimal resistance to incoming or outgoing fluid flow and the surface of any one or combination of the sail portion and the fin provides a maximal resistance to the outgoing or incoming fluid flow.

7. The fluid flow energy harvester of claim 1, wherein an axis of the pivot and an axis of the crankshaft are arranged in parallel to facilitate efficient energy transfer.

8. The fluid flow energy harvester of claim 1, wherein the crank is linked to both the crankshaft and the crank portion by way of crank pins.

9. The fluid flow energy harvester of claim 1, wherein the fin actuator comprises an electronic fluid flow sensor and an electromechanical actuator, or a hydraulic actuator, configured to guide the fin as the vane completes one full oscillation.

10. The fluid flow energy harvester of claim 1 further comprises a flywheel configured to store angular momentum to counteract stalling of vane oscillation thereby facilitating continuous rotation of the crankshaft during fluid flow.

11. The fluid flow energy harvester of claim 1 further comprises a yaw system configured for automatically orientating the crank portion or sail portion into the oncoming fluid flow with the sail portion or crank portion, respectively, into the direction of outgoing or trailing fluid flow.

12. The fluid flow energy harvester of claim 1, wherein any one or combination of the vane and the fin defines a predetermined profile operatively presented to the fluid flow.

13. The fluid flow energy harvester of claim 12, wherein the predetermined profile is configured to generate lift from the fluid flow.

14. A fluid flow energy harvesting system operatively arrangeable in a fluid flow, the harvester comprising:

a crankshaft; and two or more vanes each pivoted into complementary sail and crank portions on respective sides of such respective pivots, the sail and crank portions being operatively oscillatable about the respective pivots, each of the crank portions being linked to the crankshaft via a crank so that operative oscillation of the vanes imparts rotational force to the crankshaft;

a fin steerably arranged on the vane with a fin actuator configured to operatively steer an orientation of the fin relative to the vane;

wherein each of the vanes are operably linked to the crankshaft such that during oscillation of the respective sail portions, at least one surface of a sail portion impedes the fluid flow when a surface of the other is parallel to such fluid flow to counteract stalling of vane oscillation thereby facilitating continuous rotation of the crankshaft during fluid flow;

wherein a fin actuator including a linkage between a fin and a camming groove defined in the crankshaft or defined in a camshaft driven by the crankshaft, the camming groove being configured to steer or guide an orientation of the fin by way of the linkage as the vane completes one full oscillation so that, during oscillation of the sail portion, either a surface of the sail portion or of the fin impedes the fluid flow when a surface of the other is substantially parallel to such fluid flow, thereby counteracting stalling of vane oscillation to facilitate continuous rotation of the crankshaft during fluid flow.

15. The system of claim 14, wherein the vanes are each coaxially pivoted or have parallel axial pivots with their respective crank portions linked to positions on the crankshaft, so that respective oscillations of the vanes impart a balanced rotational force on the crankshaft.

16. The fluid flow energy harvester of claim 14, wherein the crank is linked to both the crankshaft and the crank portion by way of crank pins.

17. The fluid flow energy harvester of claim 14, wherein the fin actuator comprises an electronic fluid flow sensor and an electromechanical actuator, or a hydraulic actuator, configured to guide the fin as the vane completes one full oscillation.

18. The system of claim 14 further comprises a flywheel configured to store angular momentum to counteract stalling of vane oscillation thereby facilitating continuous rotation of the crankshaft during fluid flow.

19. The system of claim 14 further comprises a yaw system configured for automatically orientating the crank portions and sail portions into a path of fluid flow.

20. A method of using a fluid flow energy harvester for harvesting energy from a fluid flow, the method comprising the steps of:

a) providing a fluid flow energy harvester comprising:

a crankshaft;

at least one vane pivoted into complementary sail and crank portions on respective sides of such pivot, the sail and crank portions operatively oscillatable about the pivot, the crank portion being linked to the crankshaft via a crank so that operative oscillation of the vane imparts rotational force to the crankshaft; and a fin arrangement comprising a fin steerably arranged on the vane with a fin actuator configured to operatively steer an orientation of the fin relative to the vane;
b) arranging the fluid flow energy harvester into a fluid flow;
c) steering the fin by way of the fin actuator to orientate the fin relative to the vane so that, during oscillation of the sail portion, either a surface of the sail portion or of the fin impedes the fluid flow when a surface of the other is substantially parallel to such fluid flow, thereby counteracting stalling of vane oscillation to facilitate continuous rotation of the crankshaft during fluid flow; and
d) harvesting energy from the crankshaft when rotating.

* * * * *